(Model.)

F. ECAUBERT.
WATCH MAKER'S LATHE.

No. 252,087. Patented Jan. 10, 1882.

Witnesses:
Martin Russenberger
George Fey

Inventor.
Frédéric Ecaubert

United States Patent Office.

FRÉDÉRIC ECAUBERT, OF NEW YORK, N. Y.

WATCH-MAKER'S LATHE.

SPECIFICATION forming part of Letters Patent No. 252,087, dated January 10, 1882.

Application filed June 4, 1880. (Model.)

*To all whom it may concern:*

Be it known that I, FRÉDÉRIC ECAUBERT, of the city and State of New York, have invented an Improvement in Jewelers' Lathes, of which the following is a specification.

Lathes for jewelers and watch-case makers have been made with a tubular spindle, through which runs a draw-bar, by which the expansible chuck at the end of the spindle is operated. This expansible chuck is adapted to receive a ring, a watch-case center or lid, or other hollow article to be turned, polished, burnished, or spun.

In consequence of the spindle being tubular throughout its entire length, the back bearing or journal of the spindle cannot be a pointed cone, and hence the front journal is liable to tighten in its bearing and become heated by friction, especially when spinning any article and pressing endwise upon the spindle.

My invention is made for using an expansive chuck and its draw-bar with a spindle having a conical back bearing or journal.

Figure 1:
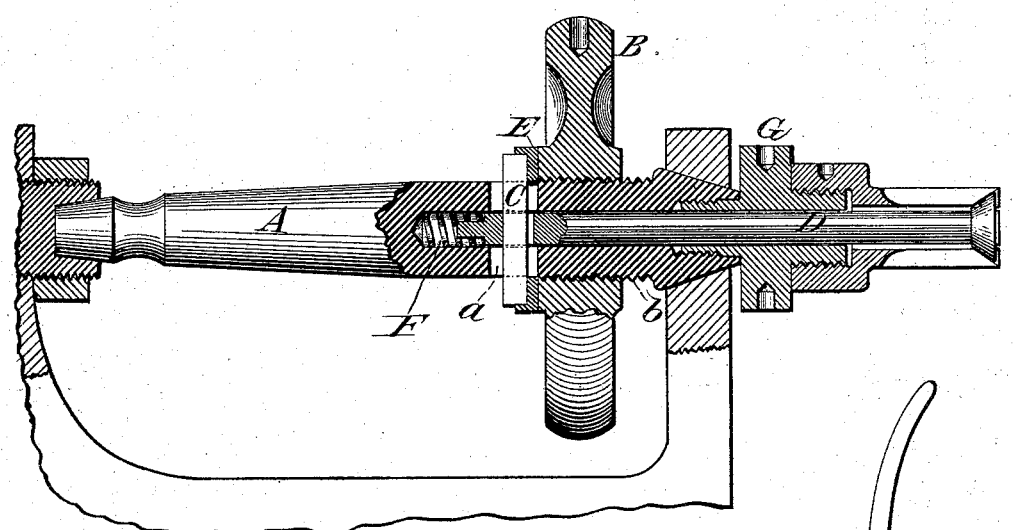
Figure 2:
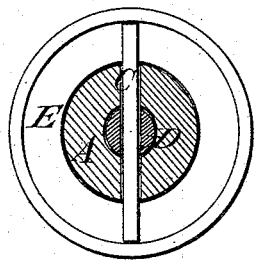
Figure 3:
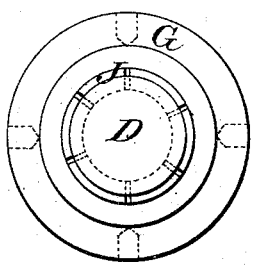
Figure 4:
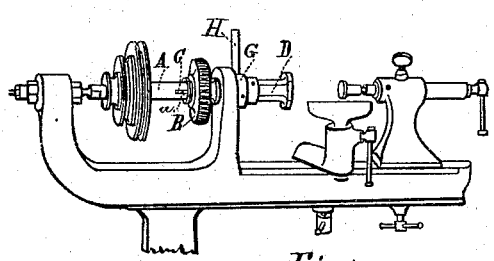

In the drawings, Figure 1 is an elevation of my improvement, partially in section. Fig. 2 is an elevation of the flanged washer and key and section of the draw-bar. Fig. 3 represents the split expansive chuck and chuck-base and its holdfast, and Fig. 4 is a perspective view of the lathe complete.

The spindle A is of any usual character, except in the particulars hereinafter named. It has a tapering rear end, forming a journal that enters the recessed end of a screw-bearing, and the spindle near the forward end is tapering to enter the bearing in the mandrel-head of the lathe. These parts are well known in lathes, and need not be further described.

Jewelers' lathes seldom have an exterior screw at the end. I therefore provide the chuck-base G, that has a rearward-projecting screw to enter the female screw at the end of the spindle A, and another male screw at the other side, upon which the expansible chuck is screwed. This chuck may be of any known or desired character, and it is provided with the draw-bar D, passing through the same, and having a conical head to act within the chuck, as now usual. In order, however, to hold the chuck-base G while screwing on or removing the chuck, I provide a holdfast, H, that is hinged at its lower end to the mandrel-head, and has a stud to enter one of the holes in the periphery of the chuck-base.

In cases where the base of the chuck is adapted to screw into the end of the spindle A, or where the end of the spindle A has an exterior screw-thread instead of an interior screw-thread, the chuck-base G may be dispensed with, the other parts remaining unchanged. Lathe-spindles with interior or exterior screw-threads are well known.

The draw-bar D, instead of passing through the spindle, is of a length to reach the hollow of the spindle, where the spring F acts against the draw-bar to push it forward and allow the expansible chuck to contract when not otherwise acted upon.

There is a mortise transversely through the draw-bar near its back end, into which is received the key C, and the spindle is slotted longitudinally for this key and there is around the spindle a washer, E, with a flange or rim at the ends of the key to prevent the key falling out; and B is a nut upon the screw-threaded surface of the spindle, by which the draw-bar is moved back to expand the chuck, or by the reverse movement to allow the chuck to contract. It will be evident that this nut B may be fluted on its exterior surface, or made as a hand-wheel, and that the chuck is operated by the same in the most efficient manner. When the chuck is not in use the draw-bar can be pushed in by hand, the key C withdrawn, the bar D taken out, and the chuck taken off. By the reverse movements another chuck can be put in place and prepared for use.

This improvement may be applied upon many of the ordinary forms of lathes, so as to adapt the same to expanding chucks without requiring a tubular spindle, as heretofore usually necessary.

I claim as my invention—

1. The combination, with the draw-bar D, of the cross-key C, nut B, and spindle A, substantially as set forth.

2. The combination, with the spindle A, of the draw-bar D, key C, spring F, washer E, having a flange or rim to retain the key, and the nut B upon the screw-threaded spindle, substantially as set forth.

3. The combination, in a lathe, of the spindle A, chuck-base G, chuck, draw-bar D, key C, spring F, flanged washer E, and nut B, substantially as set forth.

4. The chuck-base G, having peripheral holes for the holdfast H, in combination with the chuck and the spindle A, into which spindle the chuck-base is screwed, substantially as set forth.

Signed by me, in New York, this 23d day of March, 1880.

FRÉDÉRIC ECAUBERT.

Witnesses:
MARTIN RUSSENBERGER,
GEORGE FEY.